(12) United States Patent
Yang et al.

(10) Patent No.: US 11,503,543 B2
(45) Date of Patent: Nov. 15, 2022

(54) SIGNAL TRANSMISSION METHOD AND DEVICE

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN); Di Zhang, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 49 days.

(21) Appl. No.: 15/734,966

(22) PCT Filed: Apr. 9, 2019

(86) PCT No.: PCT/CN2019/081955
§ 371 (c)(1),
(2) Date: Dec. 3, 2020

(87) PCT Pub. No.: WO2019/233175
PCT Pub. Date: Dec. 12, 2019

(65) Prior Publication Data
US 2021/0235381 A1    Jul. 29, 2021

(30) Foreign Application Priority Data

Jun. 4, 2018  (CN) .......................... 201810565645.8

(51) Int. Cl.
*H04W 52/02* (2009.01)
*H04W 76/28* (2018.01)
*H04W 72/04* (2009.01)

(52) U.S. Cl.
CPC ..... *H04W 52/0229* (2013.01); *H04W 72/042* (2013.01); *H04W 72/0446* (2013.01); *H04W 72/0466* (2013.01); *H04W 76/28* (2018.02)

(58) Field of Classification Search
CPC ........... H04W 52/0229; H04W 72/042; H04W 72/0446; H04W 72/0466; H04W 76/28;
(Continued)

(56) References Cited

U.S. PATENT DOCUMENTS

2014/0314000 A1   10/2014   Liu et al.
2015/0087255 A1   3/2015   Wentzloff et al.
(Continued)

FOREIGN PATENT DOCUMENTS

| CN | 103916901 A | 7/2014 |
|----|-------------|--------|
| CN | 107079403 A | 8/2017 |

(Continued)

OTHER PUBLICATIONS

ZTE,"Considerations on DL reference signals and channels design for NR-U", 3GPP TSG RAN WG1 Meeting #93, Busan, Korea, May 21-25, 2018, total 7 pages, R1-1806460.
(Continued)

*Primary Examiner* — Dady Chery
(74) *Attorney, Agent, or Firm* — Kilpatrick Townsend & Stockton, LLP

(57) ABSTRACT

Disclosed are a signal transmission method and device for realizing transmission of a triggered reference signal, to enable a terminal to immediately utilize a reference signal to perform a corresponding operation, lower power consumption of the terminal, and to achieve power saving effects. The embodiments of the present application provide a signal transmission method at a network side, the method comprising: sending to a terminal a wakeup signal used to wake up the terminal; and sending a reference signal to the
(Continued)

terminal; or sending to a terminal a wakeup signal used to wake up the terminal and a message indicating whether the network side will send a reference signal.

12 Claims, 8 Drawing Sheets

(58) Field of Classification Search
CPC .............. H04W 36/0085; H04L 5/0053; H04L 5/0048; H04L 5/0078; H04L 5/0094; Y02D 30/70
See application file for complete search history.

(56) References Cited

U.S. PATENT DOCUMENTS

| | | | |
|---|---|---|---|
| 2016/0037448 A1 | 2/2016 | Moustafa | |
| 2016/0337931 A1* | 11/2016 | Wang | H04W 48/20 |
| 2018/0007734 A1* | 1/2018 | Kela | H04W 52/0216 |
| 2018/0097598 A1* | 4/2018 | Ang | H04L 5/0078 |
| 2018/0103407 A1 | 4/2018 | Nagaraja et al. | |
| 2019/0053321 A1* | 2/2019 | Islam | H04W 72/046 |

FOREIGN PATENT DOCUMENTS

| | | |
|---|---|---|
| CN | 107251612 A | 10/2017 |
| CN | 107431982 A | 12/2017 |
| CN | 108012315 A | 5/2018 |
| TW | 200950388 A | 12/2009 |
| TW | 201031242 A1 | 8/2010 |
| TW | 201735690 A | 10/2017 |

OTHER PUBLICATIONS

Intel Corporation, "WUS consideration for eFeMTC", 3GPP TSG RAN WG2 Meeting # 101, Athens, Greece, Feb. 26-Mar. 2, 2018, total 6 pages, R2-1803302.

* cited by examiner

SIGNAL TRANSMISSION METHOD AND DEVICE

The present application is a National Stage of International Application No PCT/CN2019/081955, filed on Apr. 9, 2019, which claims the priority from Chinese Patent Application No. 201810565645.8, filed with the Chinese Patent Office on Jun. 4, 2018 and entitled "Signal Transmission Method and Device", which is hereby incorporated by reference in its entirety.

FIELD

The present application relates to the field of communication technologies, and particularly to a signal transmission method and device.

BACKGROUND

The reference signals in the existing wireless communication systems include: Primary Synchronization Signal (PSS)/Secondary Synchronization Signal (SSS), Cell Reference Signal (CRS), Channel State Information Reference Signal (CSI-RS), Sounding Reference Signal (SRS), etc. These reference signals are used for the synchronization detection, time-frequency tracking, Radio Resource Management (RRM) measurement (Reference Signal Receiving Power (RSRP), Reference Signal Receiving Quality (RSRQ), Received Signal Strength Indicator (RSSI)), downlink channel state estimation, uplink channel estimation and others in the Long Term Evolution (LTE) or Next Radio (NR) systems. A User Equipment (UE) needs to receive the reference signals on the corresponding resources in accordance with the Radio Resource Control (RRC) configuration information or Downlink Control Indication (DCI) instruction.

BRIEF SUMMARY

The embodiments of the present application provide a signal transmission method and device to realize the transmission of the on-demand reference signal, so that a terminal can quickly use the reference signal to perform the corresponding operations, and the power consumption of the terminal is reduced, achieving the power saving effect.

At the network side, a signal transmission method provided by an embodiment of the present application includes:
transmitting a wakeup signal for waking up a terminal to the terminal; and transmitting a reference signal to the terminal;
or transmitting a wakeup signal for waking up a terminal and indication information indicating whether a network side transmits a reference signal to the terminal.

With this method, the wakeup signal for waking up the terminal is transmitted to the terminal, and then the reference signal is transmitted to the terminal; or the wakeup signal for waking up the terminal and the indication information indicating whether the network side transmits the reference signal to the terminal. Thus, the transmission of the on-demand reference signal can be realized, so that the terminal can be woken up by the wakeup signal in the power saving mode, and then the reference signal is used to perform the corresponding operations quickly, so the power consumption of the terminal can be reduced, achieving the power saving effect.

In one embodiment, after transmitting the wakeup signal to the terminal, the method further includes:
transmitting a Physical Downlink Control Channel (PDCCH), or a physical downlink traffic channel, or a physical downlink reference signal other than the reference signal to the terminal.

In one embodiment, the wakeup signal is transmitted to the terminal at a first time; and the reference signal is transmitted to the terminal at a second time; and the first time is earlier than or equal to the second time.

In one embodiment, the PDCCH or the physical downlink traffic channel or the physical downlink reference signal other than the reference signal is transmitted to the terminal at a third time; and the third time is later than or equal to the second time; or the third time is earlier than or equal to the second time.

In one embodiment, the reference signal occupies one or more Orthogonal Frequency Division Multiplexing (OFDM) symbols, and when a plurality of OFDM symbols are occupied, the plurality of OFDM symbols are transmitted continuously or discontinuously.

Correspondingly, at the terminal side, a signal transmission method provided by an embodiment of the present application includes:
receiving a wakeup signal transmitted by a network side to wake up a terminal; and receiving a reference signal transmitted by the network side;
or receiving a wakeup signal transmitted by a network side to wake up a terminal;
obtaining indication information indicating whether the network side transmits a reference signal; and determining whether to receive the reference signal according to the indication information.

In one embodiment, after receiving the wakeup signal, the method further includes:
receiving a Physical Downlink Control Channel (PDCCH), or a physical downlink traffic channel, or a physical downlink reference signal other than the reference signal transmitted by the network side.

In one embodiment, the wakeup signal is a first wakeup signal from a serving cell, and the first wakeup signal is received at a first time;
the reference signal is a first reference signal from the serving cell, and the first reference signal is received at a second time;
and the first time is earlier than or equal to the second time.

In one embodiment, the PDCCH or the physical downlink traffic channel or the physical downlink reference signal other than the reference signal transmitted by the network side is received at a third time; and the third time is later than or equal to the second time; or the third time is earlier than or equal to the second time.

In one embodiment, after receiving the first wakeup signal, the method further includes:
receiving a second wakeup signal from a neighbor cell;
receiving a second reference signal from the neighbor cell.

In one embodiment, the indication information is obtained from the wakeup signal, or the indication information is obtained from a sequence for descrambling the wakeup signal.

At the network side, a signal transmission device provided by an embodiment of the present application includes:
a memory configured to store program instructions;
a processor configured to invoke the program instructions stored in the memory, and in accordance with the obtained program, perform the process of:

transmitting a wakeup signal for waking up a terminal to the terminal;
transmitting a reference signal to the terminal;
or
a processor configured to invoke the program instructions stored in the memory, and in accordance with the obtained program, perform the process of:
transmitting a wakeup signal for waking up a terminal and indication information indicating whether a network side transmits a reference signal to the terminal.

In one embodiment, after transmitting the wakeup signal to the terminal, the processor is further configured to:
transmit a Physical Downlink Control Channel (PDCCH), or a physical downlink traffic channel, or a physical downlink reference signal other than the reference signal to the terminal.

In one embodiment, the wakeup signal is transmitted to the terminal at a first time; and the reference signal is transmitted to the terminal at a second time; and the first time is earlier than or equal to the second time.

In one embodiment, the PDCCH or the physical downlink traffic channel or the physical downlink reference signal other than the reference signal is transmitted to the terminal at a third time; and the third time is later than or equal to the second time; or the third time is earlier than or equal to the second time.

In one embodiment, the indication information is in the wakeup signal, or the indication information is in a sequence for scrambling the wakeup signal.

In one embodiment, the reference signal occupies one or more Orthogonal Frequency Division Multiplexing (OFDM) symbols, and when a plurality of OFDM symbols are occupied, the plurality of OFDM symbols are transmitted continuously or discontinuously.

At the terminal side, a signal transmission device provided by an embodiment of the present application includes:
a memory configured to store program instructions;
a processor configured to invoke the program instructions stored in the memory, and in accordance with the obtained program, perform the process of:
receiving a wakeup signal transmitted by a network side to wake up a terminal;
receiving a reference signal transmitted by the network side;
or
a processor configured to invoke the program instructions stored in the memory, and in accordance with the obtained program, perform the process of:
receiving a wakeup signal transmitted by a network side to wake up a terminal;
and obtaining indication information on whether the network side transmits a reference signal; and determining whether to receive the reference signal according to the indication information.

In one embodiment, after receiving the wakeup signal, the processor is further configured to:
receive a Physical Downlink Control Channel (PDCCH), or a physical downlink traffic channel, or a physical downlink reference signal other than the reference signal transmitted by the network side.

In one embodiment, the wakeup signal is a first wakeup signal from a serving cell, and the first wakeup signal is received at a first time;
the reference signal is a first reference signal from the serving cell, and the first reference signal is received at a second time;
and the first time is earlier than or equal to the second time.

In one embodiment, the PDCCH or the physical downlink traffic channel or the physical downlink reference signal other than the reference signal transmitted by the network side is received at a third time; and the third time is later than or equal to the second time; or the third time is earlier than or equal to the second time.

In one embodiment, after receiving the first wakeup signal, the processor is further configured to:
receive a second wakeup signal from a neighbor cell;
receive a second reference signal from the neighbor cell.

In one embodiment, the processor obtains the indication information from the wakeup signal, or obtains the indication information from a sequence for descrambling the wakeup signal.

At the network side, another signal transmission device provided by an embodiment of the present application includes:
a first transmission device configured to transmit a wakeup signal for waking up a terminal to the terminal;
a second transmission device configured to transmit a reference signal to the terminal;
or the device includes:
a first transmission device configured to transmit a wakeup signal for waking up a terminal and indication information on whether a network side transmits a reference signal to the terminal.

At the terminal side, another signal transmission device provided by an embodiment of the present application includes:
a first receiving device configured to receive a wakeup signal transmitted by a network side to wake up a terminal;
a second receiving device configured to receive a reference signal transmitted by the network side;
or the device includes:
a first receiving device configured to receive a wakeup signal transmitted by a network side to wake up a terminal; and obtain indication information on whether the network side transmits a reference signal;
a second receiving device configured to determine whether to receive the reference signal according to the indication information.

Another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application.

DETAILED DESCRIPTION OF THE EMBODIMENTS

Figure 1:
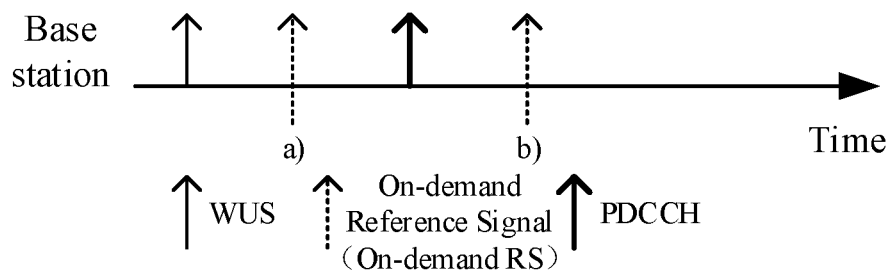
FIG. 1 is a schematic diagram of signal transmission of a base station by an embodiment of the present application.

In order to make the purposes, technical solutions and advantages of the disclosure clearer, the technical solutions in the embodiments of the disclosure will be described clearly and completely below in combination with the accompanying drawings in the embodiments of the disclosure. The described embodiments are a part of the embodiments of the disclosure but not all the embodiments.

It should be understood that the technical solutions of the disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the disclosure. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In some embodiments of the disclosure, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be a Base Transceiver Station (BTS) in the GSM or CDMA, or may be a NodeB in the TD-SCDMA or WCDMA, or may be an evolutional Node B (eNodeB or eNB or e-NodeB) in the LTE, or may be a gNB in the 5G NR, which is not limited in the disclosure.

Some embodiments of the present application provide a signal transmission method and device to realize the transmission of the on-demand reference signal, so that a terminal can quickly use the reference signal to perform the corresponding operations, and the power consumption of the terminal is reduced, achieving the power saving effect.

With the development of wireless communication systems, the terminal types and service types are diversified, and the requirements of saving the terminal power, saving the network resources and satisfying various service types coexist. In order to ensure that the terminal power is saved and the service is reachable at the same time, a Wakeup Signal (WUS) is introduced. When a terminal monitors the WUS, the power consumption is relatively low. When receiving its own WUS, the terminal is woken up by the WUS and then starts the communication module (with the relatively high power consumption) to receive the paging message (paging) or receive a Physical Downlink Control Channel (PDCCH) or perform the RRM measurement or receive the synchronization message, in order to achieve the purpose of saving the terminal power.

How to perform the RRM measurement and channel measurement to obtain the power saving effect on the basis of introducing the wakeup signal.

After receiving the WUS and being waken up, a UE needs to perform the synchronization or time-frequency tracking at first, so that the UE can receive the data quickly, further reducing the energy consumption. On the other hand, after receiving the WUS and being waken up, the UE hopes to perform more operations (for example, the RRM measurements of the local area and neighbor area) during the data reception, to further reduce the energy consumption. Considering a possible solution, it is to introduce the on-demand Reference Signal (on-demand RS). The main feature of this signal is that the on-demand RS may be non-periodic or has a predefined periodic pattern. Some embodiments of the present application describe how to send the on-demand RS and the corresponding sequential steps, and discuss how to combine with the WUS.

The wakeup signal is introduced as follows: when the terminal is in the idle state, it enters a very low-power sleep state; and when the network side has the downlink data to be sent to the UE, the network side sends a wakeup signal to the UE, and the UE is waken up after receiving the wakeup signal and starts sending/receiving the data to/from the network side. When the data sending/receiving is completed, the UE enters the very low-power sleep state again. Similarly, when the terminal is in the connected state and in the inactive state, it enters a very low-power sleep state. When there is downlink data that needs to be received by the UE, a wakeup signal is sent to the UE, and the UE is waken up after receiving the wakeup signal and starts sending/receiving the data to/from the network side. Thus, the purpose of saving the UE power is further achieved.

In the technical solution provided by embodiments of the present application, when the UE is in the energy-saving configuration state, the base station can trigger the sending of the on-demand RS and the reception of the UE through the WUS, so that the UE can use the on-demand RS to perform the rapid synchronization and RRM measurement, and the energy-saving configuration state refers to that the UE is configured in the power-saving state or energy-saving state. For example, the UE can be woken up by receiving the WUS to receive the data. When the UE receives no WUS, the UE is always in the sleep state.

In an embodiments of the present application, such RS transmitted after the WUS is called on-demand RS. Compared with the RS transmission mode in the prior art, the RS transmission mode provided by the embodiment of the present application can allow the UE to use the RS to perform the rapid synchronization and RRM measurement.

Specific implementations are for example as follows.

Base station side: a signal transmission method includes follows.

Step 1: the base station sends a WUS signal in a first time window starting from the first time; and the UE can be woken up by receiving the WUS to receive the data. When the UE receives no WUS, the UE is always in the sleep state, achieving the purpose of saving the power. The first time window is a real number greater than or equal to zero. If the size of the window is zero, it corresponds to a certain moment.

Step 2: the base station sends an on-demand RS signal in a second time window starting from the second time; where the second time is greater than (that is, later than) or equal to the first time.

The second time window is a real number greater than or equal to zero. If the size of the window is zero, it corresponds to a certain moment.

Step 3: the base station sends a PDCCH or a physical downlink traffic channel or a physical downlink reference signal (e.g., CRS, CSI-RS, TRS, PBCH, PSS, SSS, SS/PBCH, etc.) other than the on-demand RS.

The third time may be greater than or equal to the second time; or the third time is less than or equal to the second time and greater than the first time.

Referring to FIG. 1, the WUS, on-demand RS and PDCCH have such a logical relationship: the WUS triggers sending the on-demand RS, so that the UE perform the synchronization or RRM measurement quickly; and furthermore, the purpose of sending the WUS is that the UE needs to process the data information (e.g., PDSCH) subsequently, and for the reception of PDSCH, there is also a need to receive the PDCCH at first to obtain the scheduling information, and then the PDSCH can be received.

For the third time that may be greater than or equal to the second time, it is aimed at the case when the on-demand RS has no predefined pattern and can be sent in any slot or symbol boundary; and at this time, the on-demand RS can be used to perform the rapid synchronization and RRM measurement; and the pattern refers to the transmission pattern of the on-demand RS in time, and the pattern used to transmit the on-demand RS can be specifically determined according to the actual needs.

For the third time less than or equal to the second time, it is aimed at the case when the on-demand RS pattern is predefined (that is, the on-demand RS is transmitted according to the fixed cycle or time pattern, and whether to send at the transmission moment depends on whether there is a WUS). If the transmission of the WUS is completed, the predefined on-demand RS pattern arrives in a time window before the UE completes the data reception and enters the sleep state, that is, the UE receives the PDCCH at first and then receives the on-demand RS; and at this time, the main function of the on-demand RS is to assist the RRM measurement for example in the RRC-idle state. If under the RRC-connected state, the DCI can trigger sending the CSI-RS to assist the RRM measurement, and the on-demand RS may not be additionally configured at this time.

Figure 2:
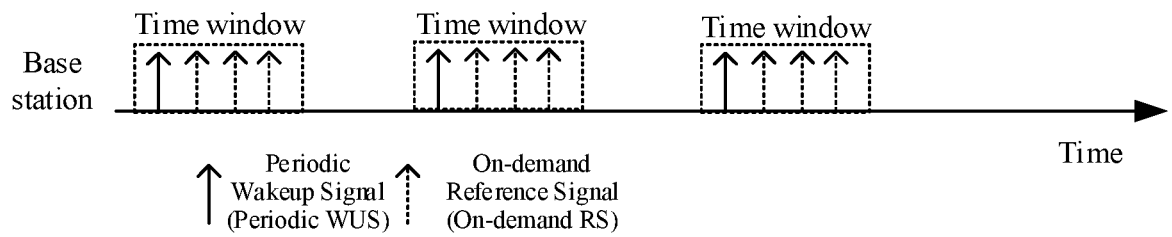
FIG. 2 is a schematic diagram of the relationship between periodic WUS and on-demand RS provided by an embodiment of the present application.
Figure 3:
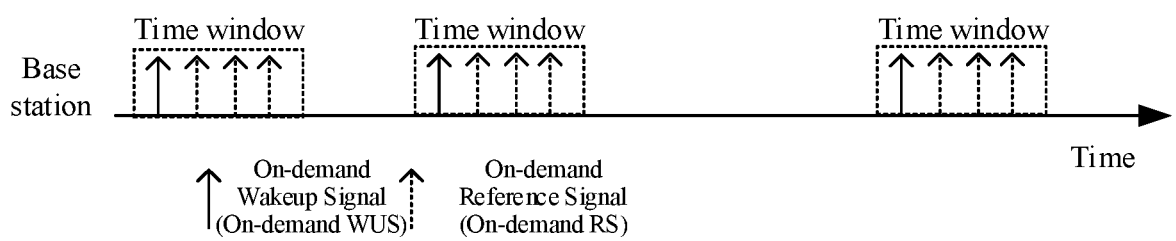
FIG. 3 is a schematic diagram of the relationship between on-demand WUS and on-demand RS provided by an embodiment of the present application.

Referring to FIGS. 2 and 3, the on-demand RS may be a reference signal transmitted by burst within the second time window, where the burst transmission means that the on-demand time for transmission includes at least one OFDM symbol. For example, the on-demand RS occupies a plurality of OFDM symbols when it is transmitted, where the plurality of OFDM symbols may be transmitted continuously or discontinuously, and may occupy one slot or different slots.

Here, the WUS shown in FIG. 2 is sent periodically, while the WUS shown in FIG. 3 is aperiodic and may be sent at any time. Therefore, the time windows in FIG. 3 are non-uniformly spaced.

FIGS. 2 and 3 show the time window of the on-demand RS, i.e., the second time window. The first time window can refer to FIG. 1, and the time position of the arrow corresponding to the WUS shown in FIG. 1 is extended to obtain the first time window.

The above first step is a way to implicitly trigger the transmission of the reference signal (on-demand RS) through the wakeup signal, that is, after the network side transmits a wakeup signal to the terminal to wake up the terminal, the terminal will receive the reference signal (on-demand RS) transmitted by the network side.

In an embodiment of the present application, there may also be a way to explicitly trigger the transmission of the reference signal (on-demand RS) through the wakeup signal, that is, the base station transmits a wakeup signal for waking up the terminal and the indication information on whether the network side transmits a reference signal to the terminal, and the indication information is contained in the wakeup signal, for example, a 1-bit indicating bit indicates whether to send the on-demand RS; or the indication information is contained in a sequence for scrambling the wakeup signal.

That is to say, the wakeup signal can carry the indication information on whether the network side transmits the reference signal (on-demand RS), so that the terminal can obtain the indication information by interpreting the wakeup signal after receiving the wakeup signal, and thus determine whether to receive the reference signal (on-demand RS) transmitted by the network side. If the indication information indicates that the network side transmits the reference signal (on-demand RS), the reference signal (on-demand RS) transmitted by the network side is received; otherwise, the reference signal (on-demand RS) transmitted by the network side is not received.

Correspondingly, if the indication information carried by the wakeup signal indicates that the network side transmits the reference signal (on-demand RS), the base station at the network side transmits the reference signal (on-demand RS); otherwise, no reference signal (on-demand RS) is transmitted.

Correspondingly, at the terminal side, a signal receiving method provided includes follows.

Step 1: a UE receives a first WUS signal in a first time window starting from the first time.

Step 2: the UE receives a first on-demand RS signal in a second time window starting from the second time.

Similarly, the second time is greater than or equal to the first time; and the second time window is a real number greater than or equal to zero.

Step 3: the UE receives a PDCCH in a third time window starting from the third time.

Similarly, the third time may be greater than or equal to the second time; or the third time is less than or equal to the second time and greater than the first time.

Figure 4:
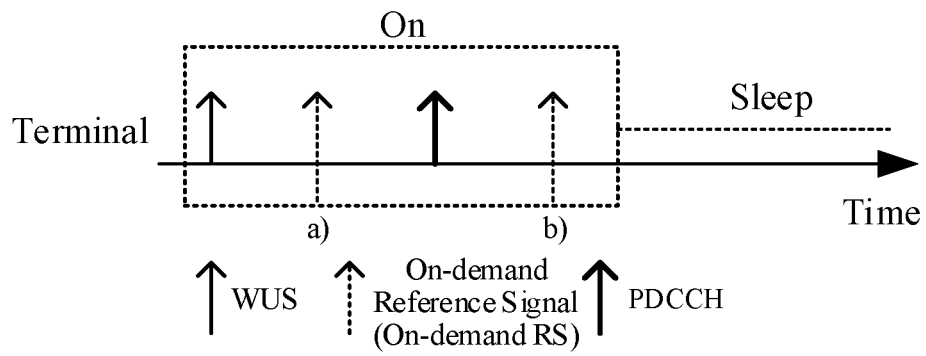
FIG. 4 is a schematic diagram of a signal receiving process of a terminal receiving signals from one base station provided by an embodiment of the present application.

Referring to FIG. 4, for the third time that may be greater than or equal to the second time, it is aimed at the case when the on-demand RS has no predefined pattern and can be received in any slot or symbol boundary; and at this time, the on-demand RS can be used to perform the rapid synchronization and RRM measurement.

For the third time less than or equal to the second time, it is aimed at the case when the on-demand RS pattern is predefined. If the reception of the WUS is completed, the predefined on-demand RS pattern arrives in a time window before the UE completes the data reception and enters the sleep state; and at this time, the main function of the on-demand RS is to assist the RRM measurement for example in the RRC-idle state. If under the RRC-connected state, the DCI can trigger sending the CSI-RS to assist the RRM measurement, and the on-demand RS may not be additionally configured at this time.

Figure 5:
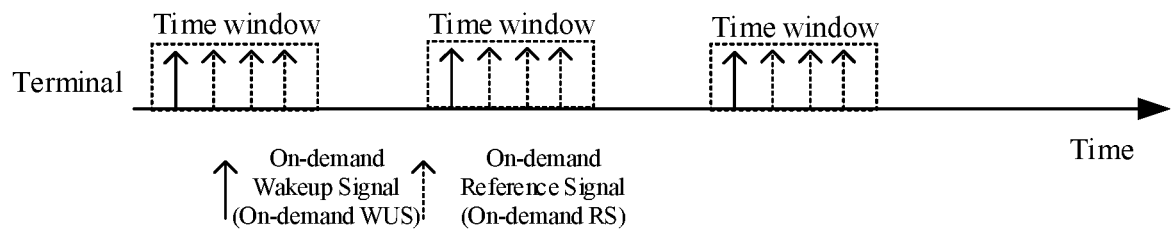
FIG. 5 is a schematic diagram of the relationship between periodic WUS and on-demand RS provided by an embodiment of the present application.
Figure 6:
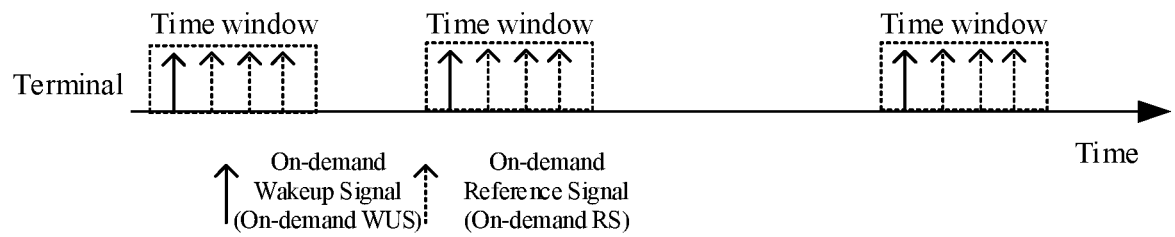
FIG. 6 is a schematic diagram of the relationship between on-demand WUS and on-demand RS provided by an embodiment of the present application.

Referring to FIGS. 5 and 6, the on-demand RS may be a reference signal transmitted by burst within the second time window, where the burst transmission means that the on-demand time for transmitting includes at least one OFDM symbol. For example, the on-demand RS occupies a plurality of OFDM symbols when it is transmitted, where the plurality of OFDM symbols may be transmitted continuously or discontinuously, and may occupy one slot or different slots.

Here, the WUS shown in FIG. 5 is transmitted periodically, while the WUS shown in FIG. 6 is aperiodic and may be transmitted at any time. Therefore, the time windows in FIG. 6 are non-uniformly spaced.

FIGS. 5 and 6 show the time window of the on-demand RS, i.e., the second time window. The first time window can refer to FIG. 4, and the time position of the arrow corresponding to the WUS shown in FIG. 4 is extended to obtain the first time window.

Considering that the UE can receive the WUS's and on-demand RS's from multiple base stations, the following steps 4 and 5 may be further included.

Step 4: the UE may receive a second WUS signal (the second WUS and the first WUS signals are from different base stations or different cells) in a fourth time window starting from the fourth time.

Step 5: the UE may receive a second on-demand RS signal (the second on-demand RS signal and the first on-demand RS signal are from different base stations or different cells) in a fifth time window starting from the fifth time.

The fifth time is greater than or equal to the fourth time; the fourth time is greater than or equal to the second time; and the fourth time window and the fifth time window are both real numbers greater than or equal to zero.

Figure 7:
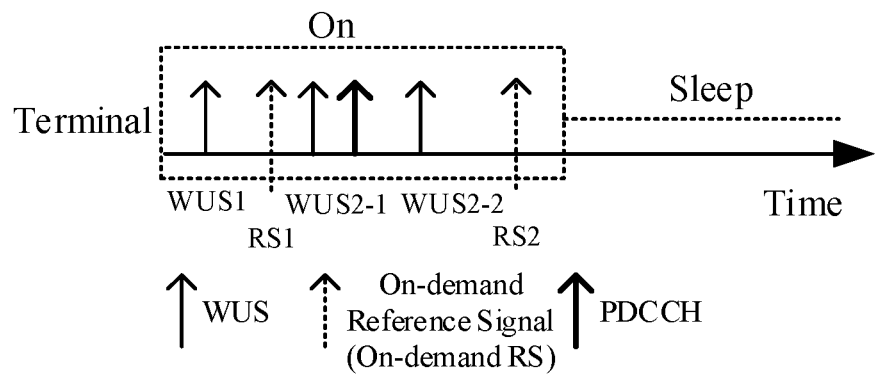
FIG. 7 is a schematic diagram of a signal receiving process of a terminal receiving signals from multiple base stations where the positions of WUS signals are different provided by an embodiment of the present application.
Figure 8:
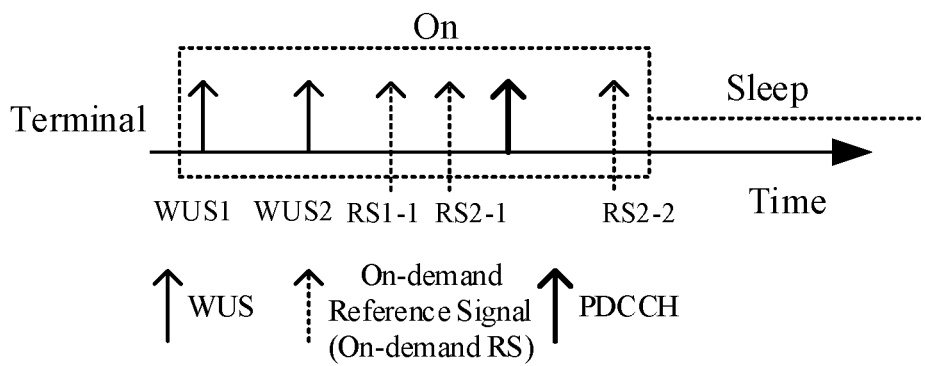
FIG. 8 is a schematic diagram of a signal receiving process of a terminal receiving signals from multiple base stations where the positions of on-demand RS signals are different provided by an embodiment of the present application.
Figure 9:
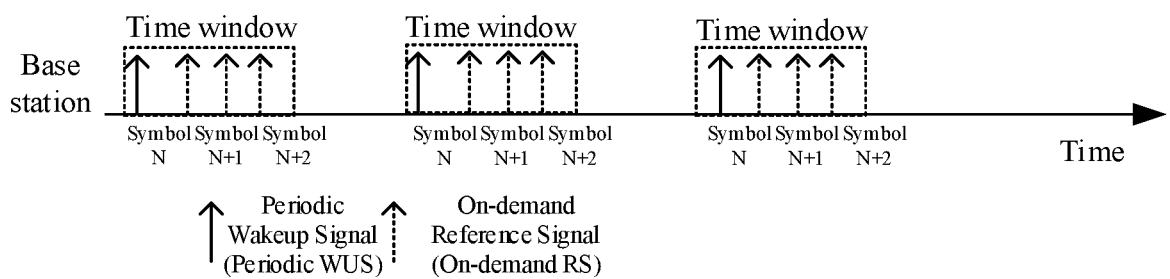
FIGS. 9 to 12 are schematic diagrams of different transmission modes of the on-demand RS burst of the base station provided by some embodiments of the present application.
Figure 10:
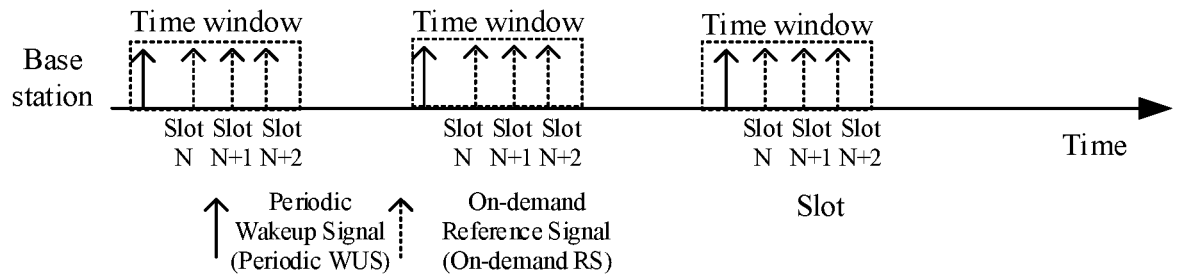
Figure 11:
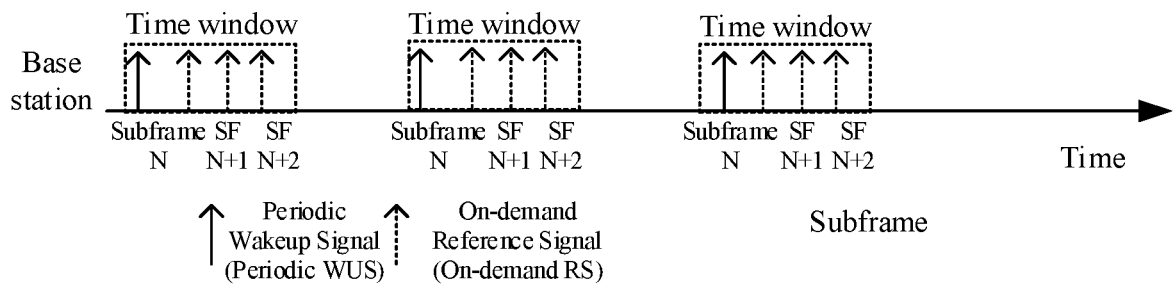
Figure 12:
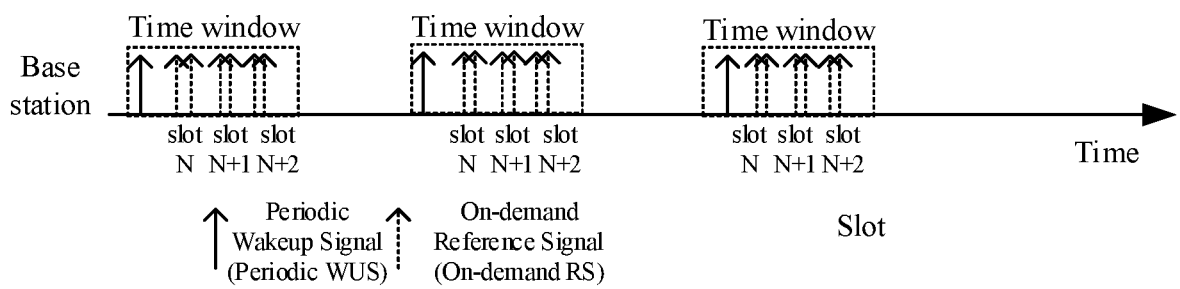
Figure 13:
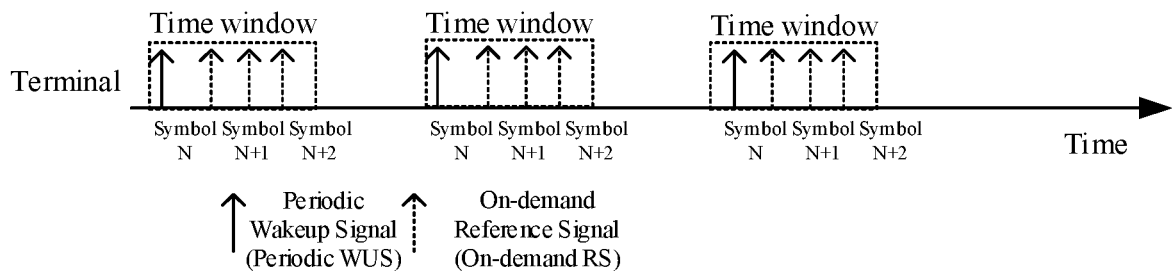
FIGS. 13 to 16 are schematic diagrams of different reception modes of the on-demand RS burst of the terminal provided by some embodiments of the present application.
Figure 14:
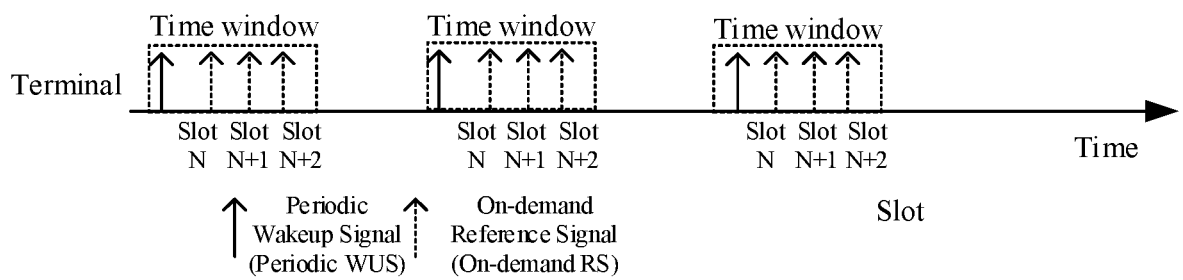
Figure 15:
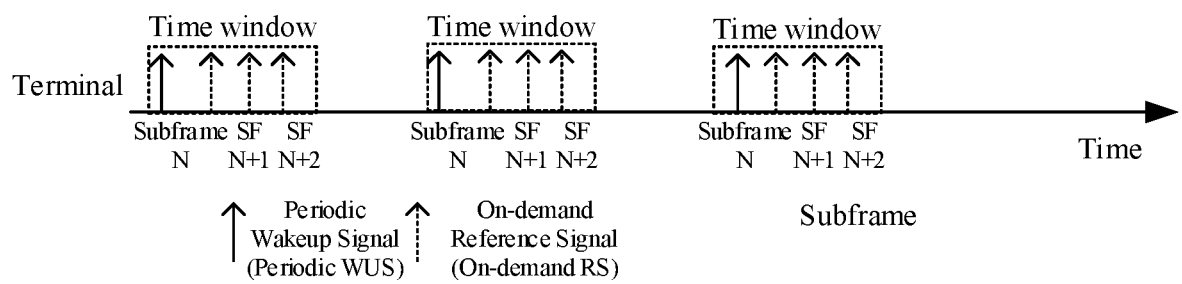
Figure 16:
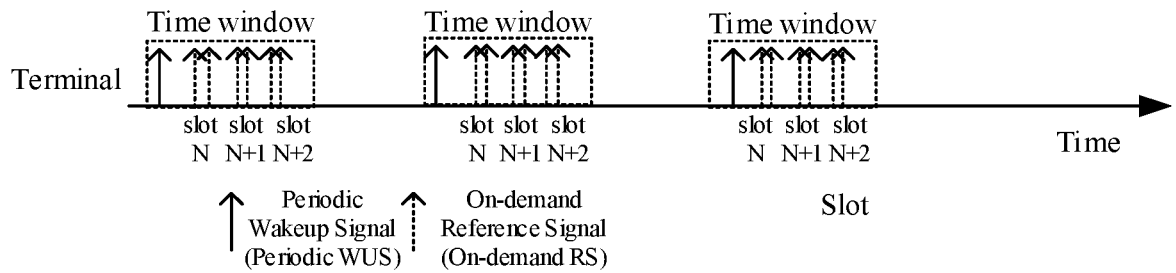

Referring to FIGS. 7 and 8, the specific description is as follows.

In addition to receiving the WUS of the serving cell or serving wakeup area, the UE also needs to measure the WUS or on-demand RS of the neighboring cell or the neighboring wakeup area in consideration of the RRM measurement requirement.

The WUS reception of the neighboring cell may occur after the UE has received the WUS of the serving cell and is waken up, that is, the fourth time is later than the first time; but it may be before or after the PDCCH reception.

The on-demand RS reception of the neighboring cell may occur after the UE has received the WUS of the neighboring cell, that is, the fifth time is later than the fourth time, but it may be before or after the PDCCH reception.

In other words, regarding steps 4 and 5, when the UE receives multiple WUS signals, it may need to trigger multiple on-demand RS's. At this time, the time relationship between WUS and on-demand RS remains unchanged, that is, the WUS is transmitted before the on-demand RS is sent. When multiple WUS's and multiple on-demand RS's are transmitted, different WUS's and on-demand RS's may overlap in time.

The time windows mentioned in embodiments of the present application mainly depend on two factors: the processing capability of the device and the precedence relationship of transmission time. For example, if the WUS triggers transmission of the on-demand RS, the time window of the on-demand RS must not extend before the reception time of the WUS. The time window of the WUS may extend to the reception moment of the on-demand RS.

Similarly, another signal receiving method at the terminal side includes:

receiving a wakeup signal sent by the network side to wake up a terminal; and obtaining the indication information on whether the network side sends a reference signal;

determining whether to receive the reference signal according to the indication information.

Here, the terminal may obtain the indication information from the wakeup signal, or obtain the indication information from a sequence for descrambling the wakeup signal.

Some embodiments are as follows.

Base Station Side

First Embodiment

Step 1: a base station transmits a WUS signal in a first time window starting from the first time.

The WUS signal may be configured periodically or non-periodically, and may be configured statically or semi-statically by the network or indicated dynamically by the base station through DCI.

The first time may be a real number, a slot boundary or a symbol boundary, and may specifically be configured statically or semi-statically by the network or indicated dynamically through DCI; and the second time window is the time window of transmitting the WUS.

The WUS signal includes: a waking area identify (waking area ID) and a cell identify (cell ID); the waking area is the area where the wakeup signals are transmitted uniformly, and the UE receives the wakeup signals in this area; and this area may include at least one transceiving point.

Step 2: the base station transmits an on-demand RS signal in a second time window starting from the second time; where the second time is greater than or equal to the first time.

The on-demand RS signal may be configured periodically or non-periodically, and may be configured statically or semi-statically by the network or indicated dynamically by the base station through DCI; it may be used for the synchronization detection and/or RRM measurement, and may specifically be configured statically or semi-statically by the network or indicated dynamically through DCI.

The second time may be a real number, a slot boundary or a symbol boundary, and may specifically be configured statically or semi-statically by the network or indicated dynamically through DCI; specifically, it may be the first slot boundary or first symbol boundary after the WUS is received; the first slot may be a positive integer; and the first symbol may be a positive integer. The second time window may be configured as a real number greater than or equal to zero, and may specifically be configured statically or semi-statically by the network or indicated dynamically; and the dynamic indication includes the dynamic indication of downlink control information indication, or the dynamic indication of downlink control channel scrambled by the radio network temporary identifier.

Referring to FIGS. 9 to 12, the second time window is the time window of transmitting the on-demand RS; and the on-demand RS is a reference signal transmitted in the burst mode within the second time window, and the transmitting in the burst mode means that the on-demand time for transmitting includes at least one OFDM symbol. Specifically, the second time window may be configured statically or semi-statically by RRC, or indicated dynamically by DCI, or pre-defined. At least one OFDM symbol is included, and specifically, the position of the OFDM symbol may be configured statically or semi-statically by RRC, or indicated dynamically by DCI, or pre-defined. If there are multiple OFDM symbols, multiple continuous OFDM symbols may be used for transmitting; or multiple continuous slots are used for transmitting; or multiple continuous slots are used for transmitting, and multiple OFDM symbols in each slot are used for sending, where the OFDM symbols may be continuous or discontinuous; or multiple subframes are used for transmitting; or multiple subframes and multiple slots are used for transmitting, where the multiple slots may be continuous or discontinuous; or multiple subframes, multiple slots and multiple OFDM symbols are used for transmitting, where each slot may be continuous or discontinuous, and the multiple OFDM symbols may be continuous or discontinuous. Specifically, it may be configured statically or semi-statically by RRC, or indicated dynamically by DCI, or pre-defined.

Step 3: the base station transmits a PDCCH in a third window starting from the third time; where the third time may be greater than or equal to the second time; or the third time is less than or equal to the second time and greater than the first time.

The third time may be a real number, a slot boundary or a symbol boundary, and may specifically be configured statically or semi-statically by the network or indicated dynamically through DCI.

The third time window is the time window of transmitting the PDCCH.

In one embodiment, if the on-demand RS is configured non-periodically, the (second time+second time window) is less than or equal to the (third time+third time window+second time window); and specifically, the on-demand RS needs to be sent within the first time window after the sending of the PDCCH is completed.

In one embodiment, if the on-demand RS is configured periodically, the second time is the predefined cycle of the on-demand RS.

Terminal Side

Second Embodiment

Step 1: a UE receives a first WUS signal in a first time window starting from the first time.

The WUS signal may be configured periodically or non-periodically, and may be configured statically or semi-statically by the network or indicated dynamically by the base station through DCI.

The first WUS signal may be the WUS signal of a serving cell.

The first time may be a real number, a slot boundary or a symbol boundary, and may specifically be configured statically or semi-statically by the network or indicated dynamically through DCI.

The WUS signal includes: a waking area ID and a cell ID; the waking area is the area where the wakeup signals are transmitted uniformly, and the UE receives the wakeup signals in this area; and this area may include at least one transceiving point.

The first time window is the time window of receiving the WUS.

Step 2: the UE receives a first on-demand RS signal in a second time window starting from the second time; where the second time is greater than or equal to the first time; and the second time window is a real number greater than or equal to zero.

The on-demand RS signal may be configured periodically or non-periodically, and may be configured statically or semi-statically by the network or indicated dynamically by the base station through DCI; it may be used for the synchronization detection and/or RRM measurement, and may specifically be configured statically or semi-statically by the network or indicated dynamically through DCI.

The first on-demand RS signal may be the on-demand RS of at least one serving cell.

The second time may be a real number, a slot boundary or a symbol boundary, and may specifically be configured statically or semi-statically by the network or indicated dynamically through DCI; specifically, it may be the first slot boundary or first symbol boundary after the WUS is received; the first slot may be a positive integer; and the first symbol may be a positive integer.

The second time window may be configured as a real number greater than or equal to zero, and may specifically be configured statically or semi-statically by the network or indicated dynamically through DCI.

The second time window is the time window of receiving the on-demand RS.

Referring to FIGS. 13 to 16, the on-demand RS is a reference signal received in the burst mode within the second time window, and the reception in the burst mode means that the on-demand time for receiving includes at least one OFDM symbol. In one embodiment, the second time window may be configured statically or semi-statically by RRC, or indicated dynamically by DCI, or pre-defined. At least one OFDM symbol is included, and specifically, the position of the OFDM symbol may be configured statically or semi-statically by RRC, or indicated dynamically by DCI, or pre-defined. If there are multiple OFDM symbols, multiple continuous OFDM symbols may be used for receiving; or multiple continuous slots are used for receiving; or multiple continuous slots are used for receiving, and multiple OFDM symbols in each slot are used for receiving, where the OFDM symbols may be continuous or discontinuous; or multiple subframes are used for receiving; or multiple subframes and multiple slots are used for receiving, where the multiple slots may be continuous or discontinuous; or multiple subframes, multiple slots and multiple OFDM symbols are used for receiving, where each slot may be continuous or discontinuous, and the multiple OFDM symbols may be continuous or discontinuous. Specifically, it may be configured statically or semi-statically by RRC, or indicated dynamically by DCI, or pre-defined.

The first on-demand RS may be the on-demand RS of at least one serving cell.

Step 3: the UE receives a PDCCH in a third window starting from the third time; where the third time may be greater than or equal to the second time; or the third time is less than or equal to the second time and greater than the first time.

The third time may be a real number, a slot boundary or a symbol boundary, and may specifically be configured statically or semi-statically by the network or indicated dynamically through DCI.

In one embodiment, if the on-demand RS is configured non-periodically, the (second time+second time window) is less than or equal to the (third time+third time window+ second time window); and specifically, the on-demand RS needs to be received within the first time window after the reception of the PDCCH is completed.

In one embodiment, if the on-demand RS is configured periodically, the second time is the predefined cycle of the on-demand RS.

Third Embodiment

Step 1: same as step 1 of the second embodiment.
Step 2: same as step 2 of the second embodiment.
Step 3: same as step 3 of the second embodiment.
Step 4: the UE receives a second WUS signal in a fourth time window starting from the fourth time.

The second WUS signal may be a WUS signal of at least one neighboring cell.

The fourth time may be a real number, a slot boundary or a symbol boundary, and may specifically be configured statically or semi-statically by the network or indicated dynamically through DCI.

The fourth time window may be a real number, and may specifically be configured statically or semi-statically by the network or indicated dynamically through DCI.

Step 5: the UE may receive a second on-demand RS signal in a fifth time window starting from the fifth time; where the fifth time is greater than or equal to the fourth time; the fourth time is greater than or equal to the second time; and the fourth time window is a real number greater than or equal to zero.

The fifth time may be a real number, a slot boundary or a symbol boundary, and may specifically be configured statically or semi-statically by the network or indicated dynamically through DCI.

The second on-demand RS may be the on-demand RS of at least one neighboring cell.

In one embodiment, if the on-demand RS is configured non-periodically, the (fifth time+fifth time window) is less than or equal to the (PDCCH reception completion moment in the third time window starting from the third time+first time window); and specifically, the second on-demand RS needs to be received within the time window of receiving the second on-demand RS after the transmission of the PDCCH is completed;

In one embodiment, if the on-demand RS is configured periodically, the fifth time is to complete the reception within the window of receiving the on-demand RS after the reception of the PDCCH is completed.

Figure 17:
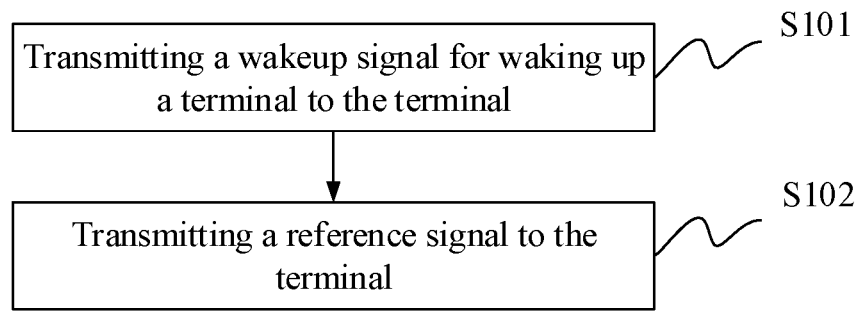
FIG. 17 is a flow schematic diagram of a signal transmission method at the network side provided by an embodiment of the present application.

In summary, referring to FIG. 17, at the network side, a signal transmission method provided by an embodiment of the present application includes:

S101: sending a wakeup signal for waking up a terminal to the terminal;

S102: sending a reference signal to the terminal. The reference signal is, for example, the on-demand RS described above.

With this method, the wakeup signal for waking up the terminal is transmitted to the terminal, and then the reference signal is transmitted to the terminal. Thus, the transmission of the on-demand reference signal can be realized, so that the terminal can be woken up by the wakeup signal in the power saving mode, and then the reference signal is used to perform the corresponding operations quickly, so the power consumption of the terminal can be reduced, achieving the power saving effect.

In one embodiment, after transmitting the wakeup signal for waking up the terminal to the terminal, the method further includes:

transmitting a Physical Downlink Control Channel (PDCCH) or a physical downlink traffic channel, or a physical downlink reference signal (e.g., CRS, CSI-RS, TRS, PBCH, PSS, SSS, SS/PBCH, etc.) other than the reference signal to the terminal.

In one embodiment, the wakeup signal for waking up the terminal is transmitted to the terminal at a first time; and the reference signal is transmitted to the terminal at a second time; and the first time is earlier than or equal to the second time.

In one embodiment, the PDCCH is transmitted to the terminal at a third time; and the third time is later than or equal to the second time; or the third time is earlier than or equal to the second time.

In one embodiment, the reference signal occupies one or more Orthogonal Frequency Division Multiplexing (OFDM) symbols, and when a plurality of OFDM symbols are occupied, the plurality of OFDM symbols are sent continuously or discontinuously.

Figure 18:
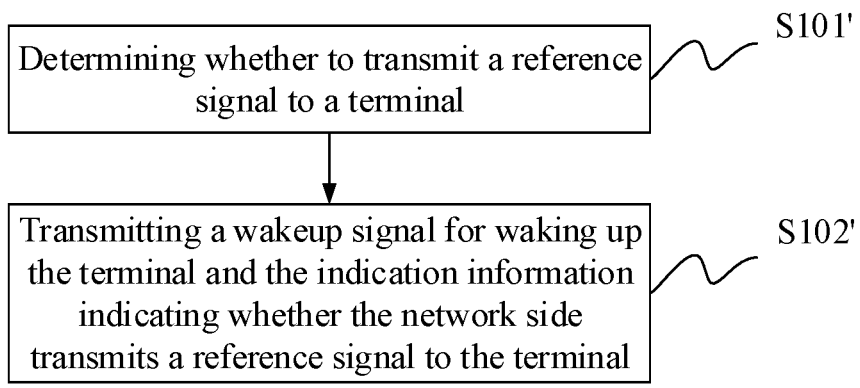
FIG. 18 is a flow schematic diagram of another signal transmission method at the network side provided by an embodiment of the present application.

Referring to FIG. 18, at the network side, another signal transmission method provided by an embodiment of the present application includes:

S101': determining whether to transmit a reference signal to a terminal;

S102': sending a wakeup signal for waking up the terminal and the indication information on whether the network side transmit a reference signal to the terminal.

Here, the indication information is contained in the wakeup signal, or the indication information is contained in a sequence for scrambling the wakeup signal.

Figure 19:
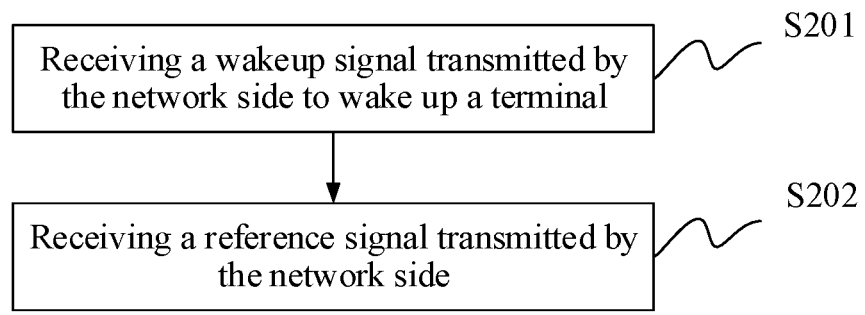
FIG. 19 is a flow schematic diagram of a signal receiving method at the terminal side provided by an embodiment of the present application.

Correspondingly, referring to FIG. 19, at the terminal side, a signal transmission method provided by an embodiment of the present application includes:

S201: receiving a wakeup signal transmitted by the network side to wake up a terminal;

S202: receiving a reference signal transmitted by the network side.

In one embodiment, after receiving the wakeup signal transmitted by the network side, the method further includes:

receiving a Physical Downlink Control Channel (PDCCH), or a physical downlink traffic channel, or a physical downlink reference signal other than the reference signal transmitted by the network side.

In one embodiment, the wakeup signal is a first wakeup signal from a serving cell, and the first wakeup signal is received at a first time;

the reference signal is a first reference signal from the serving cell, and the first reference signal is received at a second time;

and the first time is earlier than or equal to the second time.

In one embodiment, the PDCCH or the physical downlink traffic channel or the physical downlink reference signal other than the reference signal transmitted by the network side is received at a third time; and the third time is later than or equal to the second time; or the third time is earlier than or equal to the second time.

In one embodiment, after receiving the first wakeup signal, the method further includes:

receiving a second wakeup signal from a neighbor cell; for example, receiving a second WUS signal (the second WUS and the first WUS signals are from different base stations or different cells) in a fourth time window starting from the fourth time;

receiving a second reference signal from the neighbor cell, for example, receiving a second on-demand RS signal (the second on-demand RS signal and the first on-demand RS signal are from different base stations or different cells) in a fifth time window starting from the fifth time.

Figure 20:
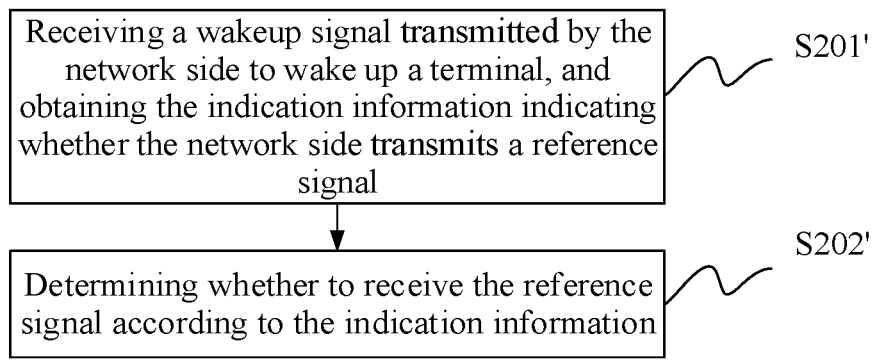
FIG. 20 is a flow schematic diagram of another signal receiving method at the terminal side provided by an embodiment of the present application.

Referring to FIG. 20, at the terminal side, another signal transmission method provided by an embodiment of the present application includes:

S201': receiving a wakeup signal transmitted by the network side to wake up a terminal; and obtaining the indication information on whether the network side sends a reference signal;

S202': determining whether to receive the reference signal according to the indication information.

Here, the indication information is obtained from the wakeup signal, or the indication information is obtained from a sequence for descrambling the wakeup signal.

Figure 21:
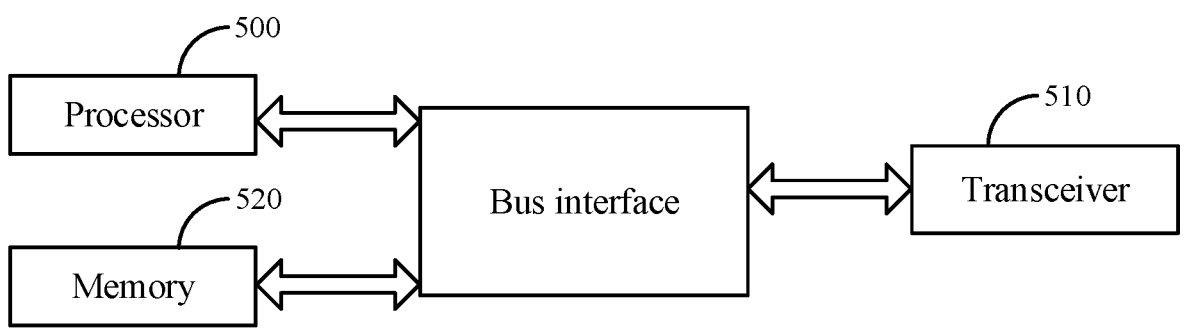
FIG. 21 is a structural schematic diagram of a signal transmission device at the network side provided by an embodiment of the present application.

Referring to FIG. 21, a signal transmission device provided by an embodiment of the present application includes:

a memory 520 configured to store program instructions;

a processor 500 configured to invoke the program instructions stored in the memory, and in accordance with the obtained program, perform the process of:

transmitting a wakeup signal for waking up a terminal to the terminal via a transceiver 510;

transmitting a reference signal to the terminal via the transceiver 510.

Alternatively, the processor 500 is configured to invoke the program instructions stored in the memory, and in accordance with the obtained program, perform the process of:

transmitting a wakeup signal for waking up a terminal and the indication information on whether the network side transmits a reference signal to the terminal via the transceiver 510.

In one embodiment, after transmitting the wakeup signal for waking up the terminal to the terminal, the processor is further configured to:

transmit a Physical Downlink Control Channel (PDCCH) or a physical downlink traffic channel, or a physical downlink reference signal other than the reference signal to the terminal via the transceiver 510.

In one embodiment, the wakeup signal for waking up the terminal is transmitted to the terminal at a first time; and the reference signal is transmitted to the terminal at a second time; and the first time is earlier than or equal to the second time.

In one embodiment, the PDCCH or the physical downlink traffic channel or the physical downlink reference signal other than the reference signal is transmitted to the terminal at a third time; and the third time is later than or equal to the second time; or the third time is earlier than or equal to the second time.

In one embodiment, the reference signal occupies one or more Orthogonal Frequency Division Multiplexing (OFDM) symbols, and when a plurality of OFDM symbols are occupied, the plurality of OFDM symbols are transmitted continuously or discontinuously.

In one embodiment, the indication information is contained in the wakeup signal, or the indication information is contained in a sequence for scrambling the wakeup signal.

The transceiver 510 is configured to receive and transmit the data under the control of the processor 500.

Here, in FIG. 21, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 22:
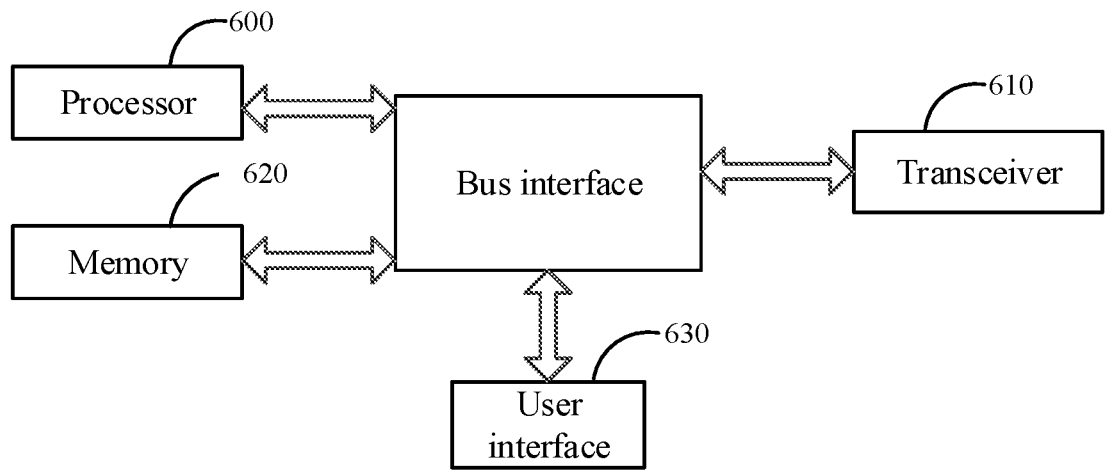
FIG. 22 is a structural schematic diagram of a signal receiving device at the terminal side provided by an embodiment of the present application.

Correspondingly, at the terminal side, referring to FIG. 22, a signal transmission device provided by an embodiment of the present application includes:

a memory 620 configured to store program instructions;

a processor 600 configured to invoke the program instructions stored in the memory, and in accordance with the obtained program, perform the process of:

receiving a wakeup signal transmitted by the network side to wake up a terminal via a transceiver 610;

receiving a reference signal transmitted by the network side via the transceiver 610.

Alternatively, the processor 600 is configured to invoke the program instructions stored in the memory, and in accordance with the obtained program, perform the process of:

receiving a wakeup signal transmitted by the network side to wake up a terminal via the transceiver 610; obtaining the indication information on whether the network side transmits a reference signal; and determining whether to receive the reference signal according to the indication information.

In one embodiment, after receiving the wakeup signal sent by the network side, the processor is further configured to:

receive a Physical Downlink Control Channel (PDCCH) transmitted by the network side via the transceiver 610.

In one embodiment, the wakeup signal is a first wakeup signal from a serving cell, and the first wakeup signal is received at a first time;

the reference signal is a first reference signal from the serving cell, and the first reference signal is received at a second time;

and the first time is earlier than or equal to the second time.

In one embodiment, the PDCCH transmitted by the network side is received at a third time; and the third time is later than or equal to the second time; or the third time is earlier than or equal to the second time.

In one embodiment, after receiving the first wakeup signal, the processor is further configured to:

receive a second wakeup signal from a neighbor cell via the transceiver 610;

receive a second reference signal from the neighbor cell via the transceiver 610.

In one embodiment, the processor 600 obtains the indication information from the wakeup signal, or obtains the indication information from a sequence for descrambling the wakeup signal.

The transceiver 610 is configured to receive and transmit the data under the control of the processor 600.

Here, in FIG. 22, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the devices for communicating with various other devices over the transmission media. For different user equipments, the user interface 630 may also be the interface capable of internal devices or external devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 can be Central Processing Unit (CPU), Application Specific Integrated Circuit (ASIC), Field-Programmable Gate Array (FPGA) or Complex Programmable Logic Device (CPLD).

Figure 23:
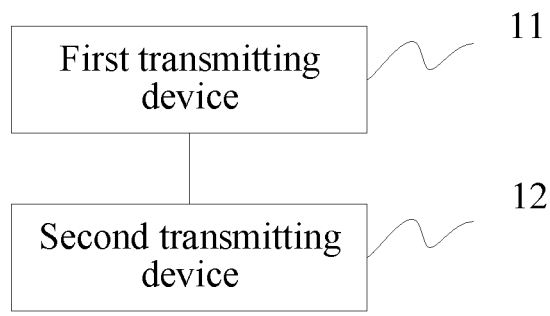
FIG. 23 is a structural schematic diagram of another signal transmission device at the network side provided by an embodiment of the present application.

At the network side, referring to FIG. 23, another signal transmission device provided by an embodiment of the present application includes:

a first transmission device 11 configured to transmit a wakeup signal for waking up a terminal to the terminal;

a second transmission device 12 configured to transmit a reference signal to the terminal.

Alternatively, another signal transmission device provided by an embodiment of the present application includes:

a first transmission device configured to transmit a wakeup signal for waking up a terminal and indication information on whether a network side transmits a reference signal to the terminal.

Figure 24:
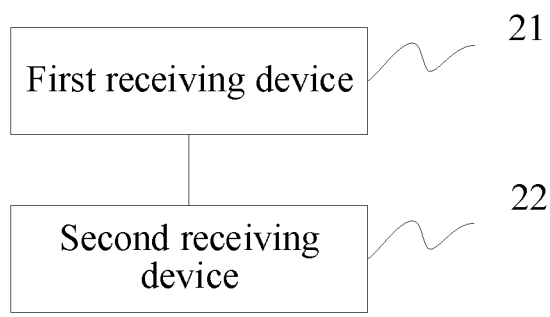
FIG. 24 is a structural schematic diagram of another signal receiving device at the terminal side provided by an embodiment of the present application.

At the terminal side, referring to FIG. 24, another signal transmission device provided by an embodiment of the present application includes:

a first receiving device 21 configured to receive a wakeup signal sent by the network side to wake up a terminal;

a second receiving device 22 configured to receive a reference signal sent by the network side.

Alternatively, another signal transmission device provided by an embodiment of the present application includes:

a first receiving device configured to receive a wakeup signal transmitted by a network side to wake up a terminal; and obtain indication information on whether the network side sends a reference signal;

a second receiving device configured to determine whether to receive the reference signal according to the indication information.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the BTS (Base Transceiver Station) in the GSM or CDMA, or may be the NodeB in the WCDMA, or may be the NodeB or eNB or e-NodeB (evolutional Node B) in the LTE, or may be the gNB in the 5G system, or the like, which is not limited in the embodiments of the present application.

The processing flows of the above methods may be implemented by a software program, which may be stored in a storage medium. When the stored software program is invoked, the above method steps are performed.

To sum up, in the embodiments of the present application, the base station transmits the first signal in the first time window starting from the first time; the base station transmits the second signal in the second time window starting from the second time; and the base station transmits the third signal in the third time window starting from the third time; where the third time may be greater than or equal to the second time; or the third time is less than or equal to the second time and greater than the first time; and the second time is greater than or equal to the first time.

The base station transmits the second signal in the second time window starting from the second time, and the on-demand RS is transmits by at least one OFDM symbol in the second time window; when the on-demand RS is transmitted by multiple OFDM symbols, the continuous OFDM symbols in the second time window are used for transmitting; or multiple slots in the second time window are used for transmitting, where the multiple slots may be continuous or discontinuous; or multiple slots and multiple OFDM symbols in the second time window are used for transmitting, where the multiple OFDM symbols may be continuous or discontinuous, and the multiple slots may be continuous or discontinuous; or multiple subframes in the second time window are used for transmitting, where the multiple subframes may be continuous or discontinuous; or multiple subframes and multiple slots in the second time window are used for transmitting, where the multiple slots may be continuous or discontinuous, and the multiple subframes may be continuous or discontinuous; or multiple subframes, multiple slots and multiple OFDM symbols in the second time window are used for transmitting, where the multiple OFDM symbols may be continuous or discontinuous, the multiple slots may be continuous or discontinuous, and the multiple subframes may be continuous or discontinuous.

A signal receiving method is provided at the terminal side.

The UE receives the first signal in the first time window starting from the first time; the UE receives the second signal in the second time window starting from the second time; and the UE receives the third signal in the third window starting from the third time; where the third time may be greater than or equal to the second time; or the third time is less than or equal to the second time and greater than the first time; and the second time is greater than or equal to the first time.

In one embodiment, the method further includes:

the UE receives the four signal in the fourth time window starting from the fourth time; and the UE receives the fifth signal in the fifth time window starting from the fifth time; where the fifth time is greater than or equal to the fourth time; and the fourth time is greater than or equal to the second time.

The terminal receives the second signal in the second time window starting from the second time, and the on-demand RS is received by at least one OFDM symbol in the second time window; when the on-demand RS is received by multiple OFDM symbols, the continuous OFDM symbols in the second time window are used for receiving; or multiple slots in the second time window are used for receiving, where the multiple slots may be continuous or discontinuous; or multiple slots and multiple OFDM symbols in the second time window are used for receiving, where the multiple OFDM symbols may be continuous or discontinuous, and the multiple slots may be continuous or discontinuous; or multiple subframes in the second time window are used for receiving, where the multiple subframes may be continuous or discontinuous; or multiple subframes and multiple slots in the second time window are used for receiving, where the multiple slots may be continuous or discontinuous, and the multiple subframes may be continuous or discontinuous; or multiple subframes, multiple slots and multiple OFDM symbols in the second time window are used for receiving, where the multiple OFDM symbols may be continuous or discontinuous, the multiple slots may be continuous or discontinuous, and the multiple subframes may be continuous or discontinuous.

In the above, the embodiments of the present application propose the methods for sending and receiving the on-demand RS. Based on these methods, the base station can realize the aperiodic sending of the on-demand RS, and the UE can also perform the corresponding reception of the on-demand RS and can thus realize the rapid synchronization and/or RRM measurement function(s) of the on-demand RS, to further save the energy of the UE.

The embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which to guide the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A signal transmission method, comprises:
transmitting a wakeup signal for waking up a terminal and indication information indicating whether a network side transmits a reference signal to the terminal;
wherein the wakeup signal is transmitted to the terminal at a first time; and the reference signal is transmitted to the terminal at a second time; wherein the first time is earlier than or equal to the second time;
wherein after transmitting the wakeup signal to the terminal, the method further comprises:
transmitting a Physical Downlink Control Channel, PDCCH, or a physical downlink traffic channel, or a physical downlink reference signal other than the reference signal to the terminal;
wherein the indication information is in the wakeup signal.

2. The method according to claim 1, wherein the PDCCH or the physical downlink traffic channel or the physical downlink reference signal other than the reference signal is transmitted to the terminal at a third time; wherein the third time is later than or equal to the second time; or the third time is earlier than or equal to the second time.

3. The method according to claim 1, wherein the reference signal occupies one or more Orthogonal Frequency Division Multiplexing, OFDM, symbols, and when a plurality of OFDM symbols are occupied, the plurality of OFDM symbols are transmitted continuously or discontinuously.

4. A signal transmission method, comprises:
receiving a wakeup signal transmitted by a network side to wake up a terminal; obtaining indication information indicating whether the network side transmits a reference signal; and determining whether to receive the reference signal according to the indication information;
wherein the wakeup signal is a first wakeup signal from a serving cell, and the first wakeup signal is received at a first time;
the reference signal is a first reference signal from the serving cell, and the first reference signal is received at a second time;
wherein the first time is earlier than or equal to the second time;
wherein after the receiving the wakeup signal, the method further comprises:
receiving a Physical Downlink Control Channel, PDCCH, or a physical downlink traffic channel, or a physical downlink reference signal other than the reference signal transmitted by the network side;
wherein the indication information is obtained from the wakeup signal.

5. The method according to claim 4, wherein the PDCCH or the physical downlink traffic channel or the physical downlink reference signal other than the reference signal is received at a third time; wherein the third time is later than or equal to the second time; or the third time is earlier than or equal to the second time.

6. The method according to claim 4, wherein after receiving the first wakeup signal, the method further comprises:
receiving a second wakeup signal from a neighbor cell;
receiving a second reference signal from the neighbor cell.

7. A signal transmission device, comprises:
a memory configured to store program instructions;
a processor configured to invoke the program instructions stored in the memory to perform the method according to claim 4.

8. The device according to claim 7, wherein the processor is further configured to invoke the program instructions stored in the memory to perform following operations:
receiving the PDCCH or the physical downlink traffic channel or the physical downlink reference signal other than the reference signal transmitted by the network side at a third time; wherein the third time is later than or equal to the second time; or the third time is earlier than or equal to the second time.

9. The device according to claim 7, wherein the processor is further configured to invoke the program instructions stored in the memory to perform following operations, after receiving the first wakeup signal:
receiving a second wakeup signal from a neighbor cell;
receiving a second reference signal from the neighbor cell.

10. A signal transmission device, comprises:
a memory configured to store program instructions;
a processor configured to invoke the program instructions stored in the memory to perform following operations:
sending a wakeup signal for waking up a terminal and indication information indicating whether a network side transmits a reference signal to the terminal;
wherein the processor is configured to invoke the program instructions to perform following operations:
transmitting the wakeup signal to the terminal at a first time; and transmitting the reference signal to the terminal at a second time; wherein the first time is earlier than or equal to the second time;
wherein the processor is further configured to invoke the program instructions to perform following operations, after transmitting the wakeup signal to the terminal:
transmitting a Physical Downlink Control Channel, PDCCH, or a physical downlink traffic channel, or a physical downlink reference signal other than the reference signal to the terminal;
wherein the indication information is in the wakeup signal.

11. The device according to claim 10, wherein the processor is configured to invoke the program instructions to perform following operations:
transmitting the PDCCH or the physical downlink traffic channel or the physical downlink reference signal other than the reference signal to the terminal at a third time; wherein the third time is later than or equal to the second time; or the third time is earlier than or equal to the second time.

12. The device according to claim 10, wherein the reference signal occupies one or more Orthogonal Frequency Division Multiplexing, OFDM, symbols, and when a plurality of OFDM symbols are occupied, the plurality of OFDM symbols are transmitted continuously or discontinuously.

* * * * *